United States Patent [19]

Kikinis

[11] Patent Number: 5,266,531
[45] Date of Patent: Nov. 30, 1993

[54] DYNAMIC HOLOGRAPHIC DISPLAY WITH CANTILEVER

[75] Inventor: Dan Kikinis, Santa Clara, Calif.

[73] Assignee: Cordata Incorporated, Roadtown, British Virgin Isls.

[21] Appl. No.: 876,061

[22] Filed: Apr. 28, 1992

Related U.S. Application Data

[62] Division of Ser. No. 648,152, Jan. 30, 1991, Pat. No. 5,151,724.

[51] Int. Cl.$^5$ .......................................... H01L 21/308
[52] U.S. Cl. .................................. 437/228; 156/644; 156/662
[58] Field of Search ................ 437/228; 156/644, 662; 148/DIG. 73

[56] References Cited

U.S. PATENT DOCUMENTS

| | | | |
|---|---|---|---|
| 4,566,935 | 1/1986 | Hornbeck | 437/228 |
| 5,018,256 | 5/1991 | Hornbeck | 437/228 |
| 5,198,390 | 3/1993 | MacDonald et al. | 437/228 |
| 5,216,537 | 6/1993 | Hornbeck | 437/228 |

FOREIGN PATENT DOCUMENTS

| | | | |
|---|---|---|---|
| 45-24893 | 8/1970 | Japan | 437/228 |
| 58-89859 | 5/1983 | Japan | 437/228 |

*Primary Examiner*—Olik Chaudhuri
*Assistant Examiner*—Ourmazd S. Ojan

[57] ABSTRACT

A dynamic holographic display has an array of reflective surfaces formed on cantilever structures substantially parallel to the surface of a substrate, such as a silicon wafer. A holographic image is formed by controlling electrical currents passed through the cantilever structures to position the reflective surfaces of the cells in the array so the topography forms a hologram, and reflected light interferes to form a holographic image. In a preferred embodiment, control is by computer and positions of reflective surfaces are determined by calculation from dimensional data available to the control computer.

2 Claims, 3 Drawing Sheets

DYNAMIC HOLOGRAPHIC DISPLAY WITH CANTILEVER

CROSS REFERENCE TO RELATED APPLICATIONS

The present application is a divisional application of application Ser. No. 07/648,152, titled "Dynamic Holographic Display With Cantilever", now U.S. Pat. No. 5,151,724, filed Jan. 30, 1991, for which a Notice of Allowance was mailed Dec. 12, 1991.

FIELD OF THE INVENTION

The present invention is in the area of apparatus for producing moving (dynamic) three-dimensional displays.

BACKGROUND OF THE INVENTION

Holography is historically the art of recording optical data and reproducing the recorded information in a three dimensional display. Early holograms were produced by illuminating photosensitive material (photographic film) with coherent light reflected from real objects combined with a coherent reference beam from the same source. The two beams would interfere, and the interference pattern was recorded on the film. When the film was developed and later illuminated by a coherent beam, a reconstructed object beam resulted, which, when viewed by a person, would appear as a three-dimensional display of the real objects that were used as a basis for the hologram.

After the discovery and development of equipment for producing holograms, several alternative methods were developed. It was discovered, for example, that media other than photographic film could be used, and that interference fringes could be developed through the thickness of a medium rather than in a plane pattern. Holograms based on fringe recording through the depth of a medium are called volume holograms, and those using other than photographic material are known as phase holograms.

Phase holograms can be either of the transmission type, in which light is passed through the medium, or the reflection type, where light is reflected from the surface. One medium for recording phase holograms is thermoplastic. With a thermoplastic medium, high power lasers are used or long exposure times. Recording is accomplished by distorting the medium, producing a surface of varying topography according to the intensity of the interference pattern of light falling on the medium.

An interesting result of phase holograms on plastic film is that the three-dimensional display can be reproduced by reflecting ordinary white light off the film. Also, the plastic hologram can be mass produced quickly and inexpensively. The original hologram is used to produce a metal "master" plate, and the metal master is used to "stamp" reproductions in other thermoplastic media. These are the three-dimensional displays that are commonly used for greeting cards and credit cards. Each of the embossed reproductions of the original hologram has the topography of the original, and the three-dimensional "picture" is a result of light reflected from the irregular surface.

Typically holograms have been stationary three-dimensional pictures, and to make an original hologram typically requires that the object to be reproduced be held very steady over a period of time while the recording is made. Moreover, there are severe restrictions on the size of objects that can be "holographed". It has long been recognized, however, that a dynamic (moving) three-dimensional display would be very desirable and have many uses.

To make a dynamic three-dimensional display requires controlling the topography of a reflection phase hologram in a way that surface height may be altered over a relatively broad area. To produce the interference fringes necessary requires physical resolution in surface height on the order of less than the wavelength of visible light. The mean wavelength in the visible spectrum is about 5500 Angstrom units, or about 0.5 micron. Moreover differences of this order of magnitude need to be provided at relatively fine resolution in a planar matrix over a display surface to present a clear picture to the human eye.

Although attempts have been made and research continues, up to the present time no one has provided a dynamic hologram that is useful and reproducible to present moving pictures of real objects, particularly not of objects in real time. What is needed is a reflective surface as a basis for a dynamic three-dimensional display with a method of controlling the topography of the surface over a range of about 1 micron in an area matrix sufficiently small to present a dynamic three-dimensional picture to the human eye. The display surface needs to be amenable to known and tried production and control techniques. Such a display tool can become the basis for many, many advanced displays, such as for guiding surgeons during delicate surgery, for example arterial-splicing techniques. Another application among many, would be improved night vision apparatus. Still another would be theoretical modeling in many disciplines, both micro- and macro-scopic.

SUMMARY OF THE INVENTION

In accordance with preferred embodiments of the invention, a cell is provided for a dynamic holographic display having a cantilever structure extending from a base structure. The cantilever structure has a reflective top film over an electrically non-conductive film, with the electrically conductive top film contacting the semiconducting material of the cantilever structure away from the root end. A control circuit provides a controlled electrical current by electrical connection to the cantilever, causing the cantilever to heat and deform, moving the reflective top film relative to the surface of the substrate.

In a preferred embodiment the base structure is a silicon substrate, such as a silicon wafer, and the cantilever is formed by etching a U-shaped trench in the surface of the substrate. Power is provided to individual cells in an array by control circuitry formed on the same substrate in the preferred embodiment, and power can be controlled by controlling the duty cycle of the power application.

An array of such cells forms a display surface wherein individual cells can be controlled to provide a reflective topography to form a stationary or moving holographic image. Control is by computer from available dimensional data in the preferred embodiment.

The invention provides a dynamic holographic display heretofore not available in the art, that is formed by known and conventional methods of integrated circuit fabrication. The invention is therefore relatively inexpensive to make and use, and provides for improvements in many kinds of devices and systems that require display, such as computer graphics and displays of data, for example from NMR scans and CAT scans.

DESCRIPTION OF THE PREFERRED EMBODIMENTS

In a preferred embodiment a matrix of physically controllable reflective cells is formed on a surface of a semiconducting substrate, such as a silicon wafer, by techniques known in the art of integrated circuit fabrication. Each cell is a small reflective area moveable with control generally at a right angle to the surface of the substrate. Also in the fabrication of the matrix on the substrate, control devices are formed and connected to the individual reflective cells by electrically conductive paths using techniques of layer formation and patterning known in the art. The end result is a surface having a large number of movable reflective areas that can be moved with suitable control to simulate a topography to reflect light in a way that a three-dimensional display is presented to a human observer. The reflection at any point in time is according to the principles of a volume phase hologram, but by moving the individual cells, the hologram display moves as well.

Figure 1:
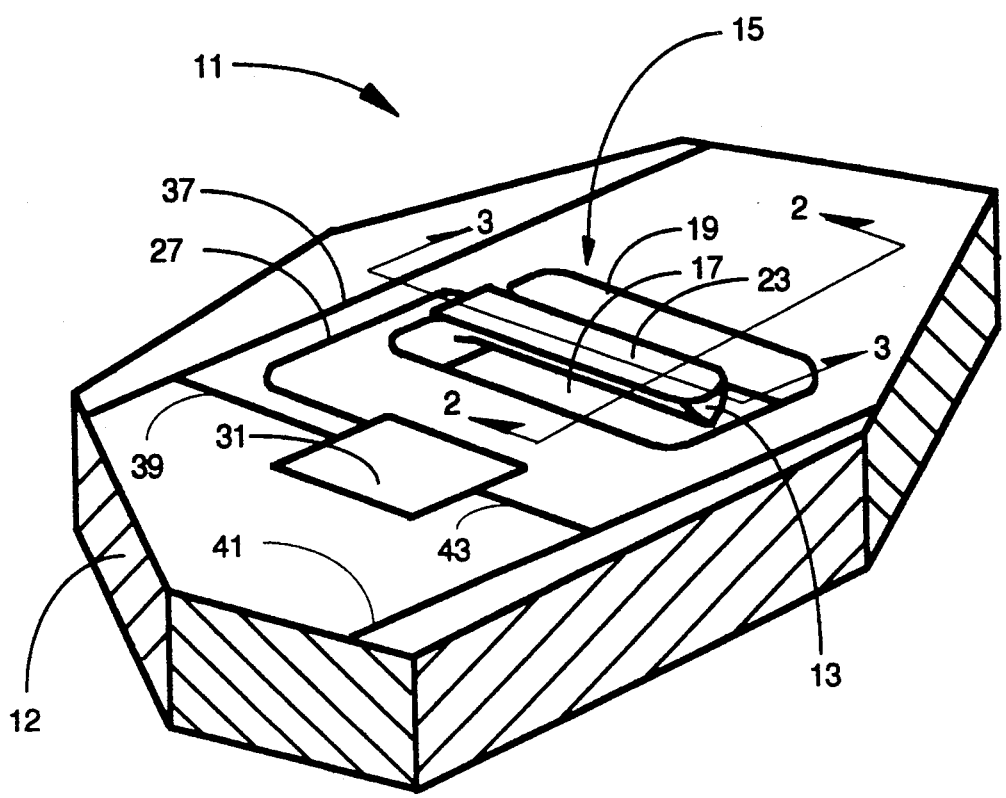
FIG. 1 is a perspective view of a single movable cell for a display surface according to a preferred embodiment of the invention.
Figure 2:
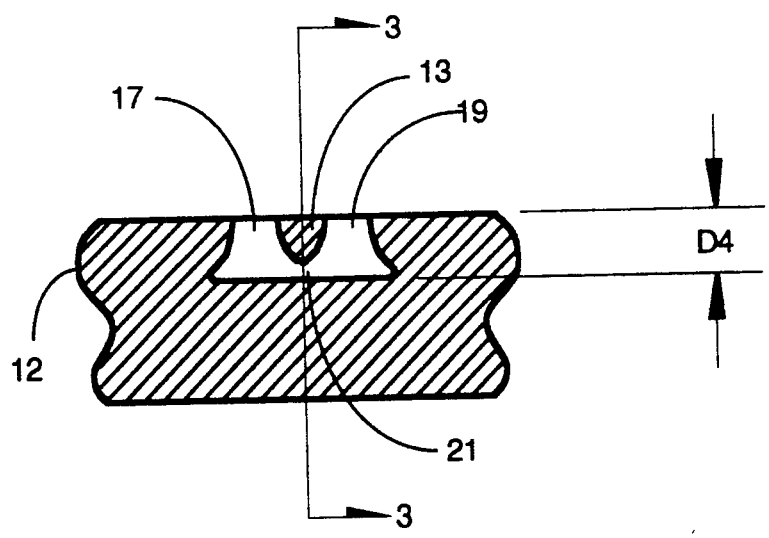
FIG. 2 is a cross-section taken generally along the section line 2—2 of FIG. 1.

FIG. 1 shows a single cell 11 of a matrix of such cells fabricated on a surface of a substrate 12. The movable member of the cell is a cantilever 13 formed as a result of etching a trench 15 in a U-shape in the surface of the substrate. Many etching techniques are known to produce an undercutting effect, and while this is a disadvantage in etching for most fabrication purposes, it has been found to be an advantage for the present invention. FIG. 2 is a cross-section view of cantilever member 13 and trench 15 taken generally along line 2—2 in FIG. 1. FIG. 2 shows the profile of the two arms, 17 and 19, of the U-shaped trench, and illustrates how the undercutting effect meets in region 21 to completely undercut the part of the material that becomes cantilever 13.

Figure 3:
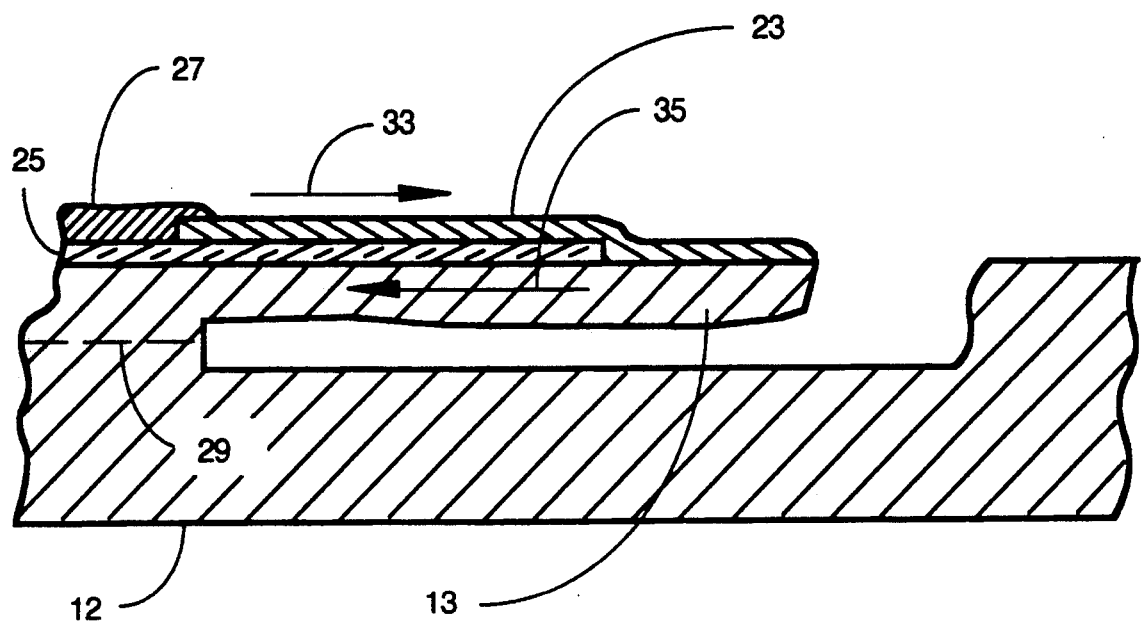
FIG. 3 is a longitudinal cross-section taken along the length of a cantilever structure, and generally along the section line 3—3 of FIG. 1.

FIG. 3 is a section through the length of cantilever 13 taken along the section line 3—3 of FIG. 1 in the direction of the arrows. Substrate 12 in the preferred embodiment is a single-crystal wafer of silicon of the sort used to fabricate integrated circuits. The volume of substrate 12 above about dotted line 29 is doped to establish a suitable conductivity, so when trench 15 is etched, the bulk of cantilever 13 consists of this doped material.

An electrically non-conductive layer 25 is formed on the surface of the structure, such as by oxidizing the silicon to form silicon dioxide. There are known in the art several ways to form a film of non-conductive material as well, such as by sputtering or by chemical vapor deposition, and one of these processes could be used, and the non-conductive layer can be formed before the trench is etched. Typically the non-conductive layer is formed to overlay all of the surface of the substrate. After forming the non-conductive layer and before applying another layer, a small portion of the non-conductive layer at the end of the cantilever is removed, leaving a surface area of doped semi-conductive material at the end of the cantilever exposed.

An electrically conductive, reflective layer 23 is next formed over the non-conductive layer by known techniques for depositing electrically conductive and reflective films, such as by sputtering or chemical vapor deposition. The electrically conductive and reflective film extends for the full length of the cantilever and makes electrical contact with the doped semi-conducting material of the cantilever at the free end, where the non-conducting layer has been removed. Those skilled in the art will appreciate that the electrically conductive film need not also be reflective, i.e. a separate film could be used for the reflective surface. Zone 31 consists of power and control circuitry formed as semiconductor devices on the substrate by techniques known in the art of IC fabrication, and generally by the "rules" of VLSI technology, in which sub-micron technology has become relatively common.

As illustrated in FIG. 3, an electric current passed from zone 31 (not shown in FIG. 3) along conductive connecting trace 27 and through electrically conductive and reflective layer 23 in the direction of arrow 33 is insulated from the bulk of substrate 12 until reaching the free end of the cantilever where the non-conducting layer has been removed. The electric current then passes into the cantilever and back in the direction of arrow 35 to the root of the cantilever, and thence into the substrate and to a suitable ground (not shown).

Trace 27 and layer 23 are highly conductive, typically aluminum, as is common in the IC fabrication art, and the bulk of cantilever 13 is more resistive, although still electrically conductive as a result of doping described above. Moreover, the cross-section of the cantilever is very small for the current path as opposed to the bulk of the substrate. As a result, the current heats the cantilever, causing the resistive, doped silicon material to expand. Since layer 23 and insulating layer 25 are not directly heated, and also because the top of the cantilever is also more exposed and therefore dissipates heat more readily, the cantilever behaves like a bi-metallic strip, and bends upward raising reflective surface 23 above the nominal surface of the substrate.

By controlling the size of the cantilever (cross-sectional area), the resistivity by doping, and the current with respect to time (which may be done in any of several ways), the amount of bending of the cantilever, and hence the movement of reflective surface 23, may be controlled. In the present invention, a movement of the reflective surface over a range of about 1 micron is sufficient.

FIG. 1 shows trace 27 that leads from the power and control zone to the reflective surface for cell 11, and also a common trace 37 for power and a connecting trace 39 from trace 37 for power to area 31. Other control areas for other cells may be powered from the single power trace. Trace 41 represents a control line for control signals to power and control areas, and trace 43 represents a bus connection to area 31.

There are a number of alternative ways that the electrical path might be formed to accomplish the purpose of the preferred embodiment. For example, reflective surface 23 need not extend the full length of the cantilever. It could occupy a smaller area at the free end of the cantilever, and trace 27 could be extended along the cantilever to make the connection. On the other hand, it might be desirable to extend the reflective surface for the full width all the way to the power and control area. In any event, the traces shown and numbered 27, 37, 39, 41, and 43 are meant to be representative of electrically connective traces as are common in the art, and are not suggestive of actual sizes relative to other elements shown in the figures.

Figure 4:
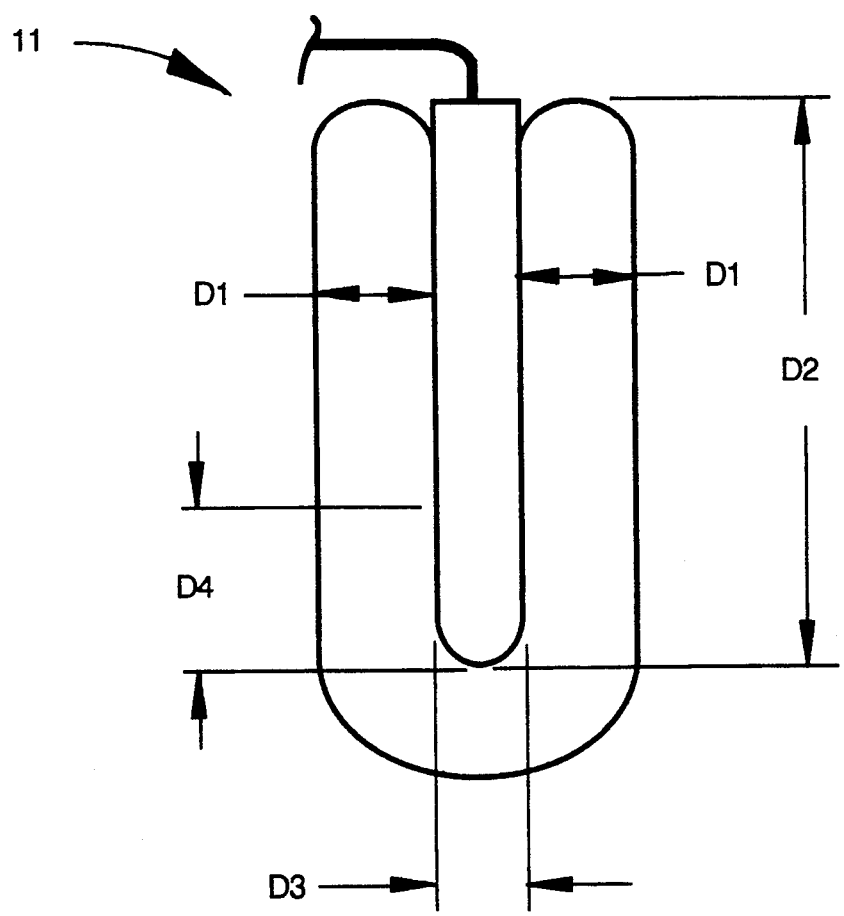
FIG. 4 is a plan view of a single cell of a display surface according to the invention, for providing dimensional reference.

FIG. 4 is a plan view of cell 11 on the surface of a substrate to provide dimensional context for the preferred embodiment. The width D1 of the U-shaped slot is about 1.5 microns, the length D2 of the cantilever is about 6 microns, and the width D3 of the cantilever is about 1 micron. The depth D4 of the trench into the surface of the substrate (dimension shown in FIG. 2) is about 2 microns.

Figure 5:
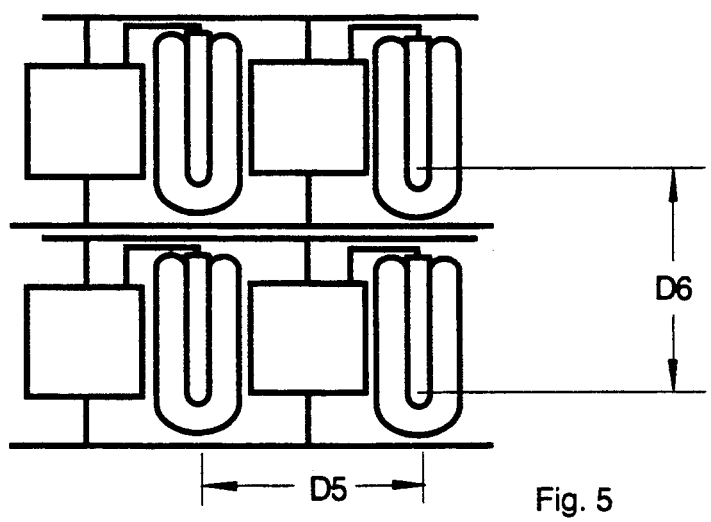
FIG. 5 is a plan view of four cells according to a preferred embodiment to provide dimensional data relative to the location of cells on a display surface.

FIG. 5 is a plan view of four cells like cell 11 arranged in a rectangular matrix, each with a separate power and control area. In this case the center-to-center dimension between cells is about 10 microns. That is, D5=D6=10 microns. In this preferred embodiment, with a 10 micron center distance, the density of cells on a surface is 108 cells per square centimeter. A density of this magnitude is well within the present capabilities of IC fabrication technology. A lower density would still be usable, but a higher density improves the resolution and quality of the display. The higher density also increases the cost of the display, and, depending on the intended use, the density can vary.

There are several different ways that individual cells can be controlled to form the necessary topography in real time for a dynamic display. For example, each cell can have an individual power lead to a central control zone either on the same surface or on another device with appropriate connections. In this case there is no individual control area such as area 31. There is a requirement for a very large number of connective traces on the surface of the display, however. In this case the density could not be as high as the 10 micron square array described above, because a lot of surface area would be devoted to connecting traces.

To avoid an unduly large number of traces, it is preferred that some control circuitry for each cell be fabricated adjacent to each cell in an array. This circuitry consists substantially of semiconductor devices that are formed in the fabrication steps leading to the display including the movable cell array. In this case, there can be common power and control traces passing along rows of cells, reducing the necessary number of traces.

Even with a power and control circuit adjacent to each cell in an array, there are still a relatively large number of ways that an individual cell may be controlled. In the preferred case, each cell has control circuitry with latching ability so each cell may be addressed individually to turn on power to the power trace leading to the cantilever. By refreshing data relative to time, the duty cycle for a cell may be varied. That is, instead of varying the current in a cantilever by changing the voltage supplied to each cell individually, a common voltage may be supplied in a common trace with enough power to handle a large number of cells. Power to each cantilever is turned off and on, and the frequency and duty cycle are changed to change the overall current flow relative to time, and hence the heating effect, and the position of the cantilever. Frequency may be changed alone, duty cycle alone, or both, as control variables to position cells. In an alternative embodiment, cells are refreshed in a fashion much like the moving spot on a CRT screen, that is in an order along rows and columns. This technique is useful because there is a small lag in time from the time a signal is refreshed to the time that a cantilever responds, and this time can be efficiently used by refreshing other cells.

In an alternative preferred embodiment, passive cells are used at specific points in the array to calibrate the system relative to the temperature, and hence the change in resistivity of the doped silicon material of the cantilevers. This is done by connecting a known voltage across a cantilever, and measuring the voltage drop, which then may be used with the known dimensions to determine the resistance. The frequency and duty cycle for cells may then be adjusted accordingly.

Figure 6:
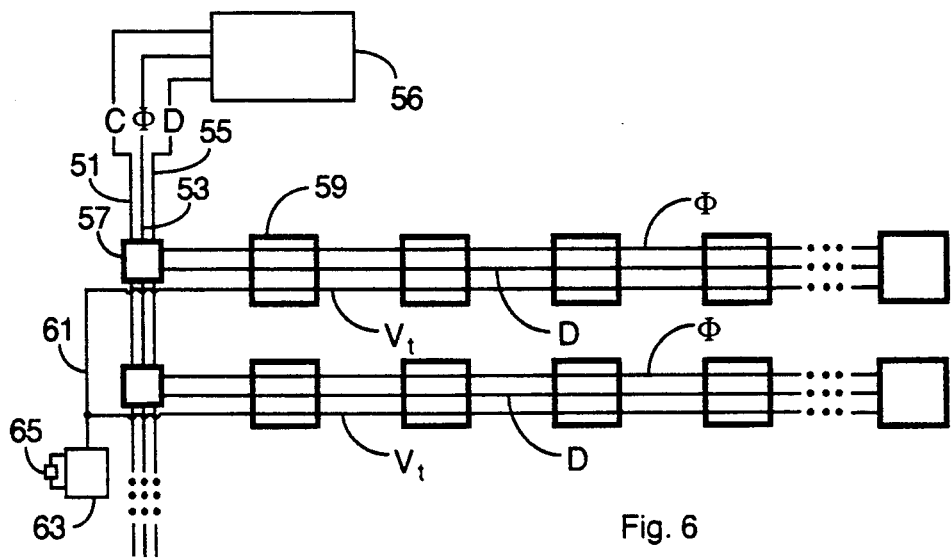
FIG. 6 is a schematic of control circuitry to switch signals from a control computer to individual cell controls in a preferred embodiment.

FIG. 6 is a diagram to illustrate a preferred arrangement for control of individual reflective cells for a dynamic hologram for the invention. Lines 51, 53, and 55 are from a control computer 56, which may be any of a wide variety of computers, where dimensional data is processed to be provided to the dynamic display of the invention.

Line 51, marked C, is a control line for indexing (switching) data by rows to cells in the display matrix. Line 53, marked with the Greek letter Phi, is a clock line as commonly used in computer applications for coordination and other timing functions. Line 55, marked D, is a data line for transferring dimensional data to individual cells to control the relative amount of movement of reflective spots in the display.

In the preferred mode, control data is transmitted serially in 4-bit data format. Control line 51 (C), and row switches, such as switch 57, are used to switch the data stream to rows in a sequential pattern, allowing positional data to be updated in a pattern sweeping across the display, or, in other embodiments, data could be refreshed preferentially in specific portions of the display that might be known to require more frequent updating than other areas.

In FIG. 6 a temperature sensor 65 provides a signal to a temperature control unit 63 that in turn provides an output voltage $V_t$ relative to the temperature sensed by sensor 65. The temperature relative output voltage is provided to the individual cells in one or more rows, or another specific region, by an output trace 61. In this way, the effect of temperature on the display can be compensated.

Figure 7:
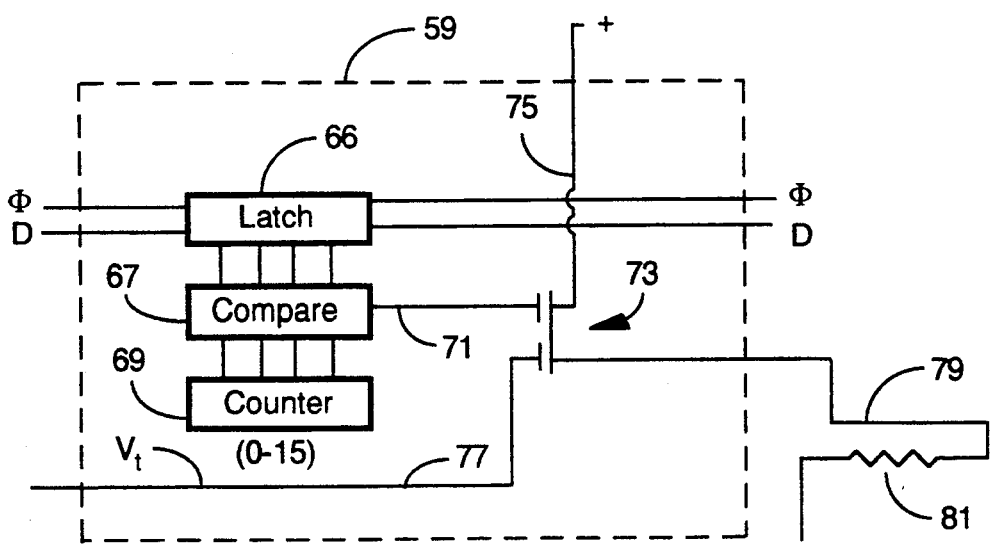
FIG. 7 is a schematic showing an individual cell controller in a preferred embodiment.

An individual cell control unit 59 is indicated in FIG. 6. FIG. 7 shows a preferred arrangement of one such cell control unit. At the individual cell control unit, the clock a data lines connect to a shift register/latch unit 66 as known in the art, allowing a data value to be shifted to an individual cell. When a data value is latched, it is compared to a cycling counter 69 in a comparator 67, and the output on line 71 is high or low for a portion of the cycle time of counter 69 relative to the latched value devided by the maximum counter value.

Drive transistor 73 is a dual-gate FET as known in the art, and current is provided to metallic layer 79 on the cantilever at the individual cell proportional to the pulse-width modified signal and the value of $V_t$. Power trace 75 is not shown in FIG. 6, but is typically a common power source for all the cells. Current passes through the conductive layer 79 and thence through the cell cantilever represented as a resistance 81 in FIG. 7.

In the preferred embodiment shown, for 4-bit data, the control area can be implemented in about 80 to 100 transistors, and will require an area of about 10 microns by 10 microns. The data word length has thusly an important effect on the spatial density of the cell array. In an alternative embodiment, a 2-bit data format will allow the control area to be reduced to circuits that may be implemented in about 20 transistors, allowing a denser array of cells, but less resolution in reflective cell position.

It will be apparent to one skilled in the art that there are a wide variety of alternatives for control circuitry, and the circuitry shown is but one of the variety that a skilled worker could implement by techniques well known in the art.

It is becoming more common in the IC industry to make wafers as large as 200 mm. in diameter (8 inch nominal diameter). The same kind of equipment can be adapted to fabricate arrays of similar dimensions, but with square or rectangular shape. For many purposes a display made of a single such unit, which would have about an area of about 400 square centimeters, would be quite adequate. In other cases, to make larger displays, multiple units could be mounted on a common backing side-by-side.

To control arrays of cells as described and form dynamic three-dimensional displays requires considerable computer power. Such computer power is readily available, however, and more powerful computers at ever lower costs relative to power are being developed. Any situation in which dimensional information is gathered or is otherwise available in computer form is a candidate for a three-dimensional display according to the present invention.

Prehaps one of the simpler cases for which the invention would be useful is computer graphics display for modeling and design. There are a relatively large number of computer programs that handle dimensional data in three dimensions. That is, each point in a matrix has associated with it numbers representing positions in a coordinate system. In the case of a cartesian system, there are typically three numbers associated with each point. Such systems display three-dimensional information in two dimensions, even though three-dimensional data is available, because there has been up to this time no three-dimensional dynamic display capable of presenting a true three-dimensional display. The present invention could be used to present such information in a true three-dimensional fashion, as a moving hologram. In that case the objects displayed would typically be solids or what are called "wireframes", and the dynamics would be provided in the form of rotating and otherwise manipulating the objects in the display.

As another example of a use for the invention, consider the case of displaying information from computer aided tomography (CAT) scans. These are typically made to analyze conditions within biological structures such as the human body. The information developed and computerized is three-dimensional in nature, but in the absence of a true three-dimensional display apparatus, display is done by what are commonly termed "slices". All the data with a common depth value, for example, is displayed as a slice of the subject; then data with a different depth value is displayed for comparison. With the display of the present invention, data from CAT scans, and suitable computer software, the data could be filtered, for example, to screen out all but data in a certain range known to represent a particular density of tissue, then that data could be displayed in three dimensions. The result would be a selective three-dimensional display of blood vessels associated with a malignant tumor, for example. Such a display would have tremendously more value than a slice display. Also, for slowly varying phenomena, such displays from CAT scans could be used to illustrate features in real time. Other systems that take measurements over 4 pisteradians at the same time could be useful to provide real time displays to guide surgeons as they work. There are many other possibilities for a display according to the invention.

It will be apparent to a person with skill in the art that there are many changes that may be made without departing from the spirit and scope of the invention. Some have already been described. The preferred embodiment was described as implemented in silicon, for example, but displays according to the invention could be fabricated using other materials, such as germanium. There are also many changes that might be made in dimensions and location of different parts of a cell, and in arrangement of cells in an array on a surface. Rectangular arrays are not required, but only convenient. There are many, many ways that cells such as described in the preferred embodiment, and in other embodiments, can be controlled. Only a few possibilities have been mentioned as representative.

What is claimed is:

1. A method of forming a movable reflective surface on a substrate for making a dynamic holographic display device comprising the steps of:

etching and undercutting a U-shaped trench in a surface of said substrate such that a cantilever structure is formed that extends in a direction substantially parallel to said substrate surface;

forming a reflective coating to at least a portion of said cantilever structure to form said movable reflective surface; and providing electrical contacts to said substrate and to said cantilever structure so that passing an electrical current through said cantilever structure heats said cantilever structure, as a result deforming said cantilever structure to thereby move said movable reflective surface.

2. A method as in claim 1 wherein said substrate comprises a doped semiconductor substrate.

* * * * *